United States Patent [19]

Hess et al.

[11] 4,272,872
[45] Jun. 16, 1981

[54] DEVICE FOR HOLDING A THIN-WALLED METAL CYLINDER

[75] Inventors: Anton Hess, Koppigen; Ramon Bellot, Utzenstorf, both of Switzerland

[73] Assignee: Fritz Buser Maschinenfabrik AG, Switzerland

[21] Appl. No.: 10,955

[22] Filed: Feb. 9, 1979

[30] Foreign Application Priority Data

Feb. 14, 1978 [CH] Switzerland ................ 1630/78

[51] Int. Cl.³ ............... B21B 31/32; B21B 31/08; G03B 27/04; F16D 1/00
[52] U.S. Cl. ...................... 29/113 R; 29/123; 355/85; 403/365; 403/371
[58] Field of Search ............ 29/113 R, 123, 129, 29/130; 403/365, 370, 371, 372; 355/85, 87

[56] References Cited

U.S. PATENT DOCUMENTS

| | | | |
|---|---|---|---|
| 2,587,606 | 3/1952 | Dungler | 29/123 |
| 3,166,013 | 1/1965 | Wyllie et al. | 29/113 R |
| 3,253,323 | 5/1966 | Saueressig | 29/113 R |
| 3,707,749 | 1/1973 | Henley | 29/113 R |
| 3,847,493 | 11/1974 | Peter et al. | 403/371 X |
| 3,858,507 | 1/1975 | Owren et al. | 29/123 X |
| 4,150,622 | 4/1979 | Stollenwerk et al. | 29/113 R |

FOREIGN PATENT DOCUMENTS

| | | | |
|---|---|---|---|
| 1347194 | 11/1963 | France | 29/123 |
| 1365313 | 5/1964 | France | 29/123 |
| 150049 | 5/1955 | Sweden | 403/365 |
| 29605 | of 1904 | United Kingdom | 355/85 |

*Primary Examiner*—James Kee Chi
*Attorney, Agent, or Firm*—Roylance, Abrams, Berdo & Farley

[57] ABSTRACT

A thin-walled hollow metal cylinder is rotatably held at its ends between holding flanges which are mounted with a pressure-tight seal on an opposing aligned pair of rotatable hubs. The spacing between the hubs can be adjusted. In one embodiment, the hubs are supported on a hollow pipe arbor and make a pressure-tight seal against it. In another embodiment, one hub is mounted on a stub shaft which is held in bearings and another is held in the head stock of a lathe in proper alignment. In both cases, a pressure medium, air, is supplied to the inner space of the cylinder through the arbor at a pressure of about 0.5 to about 1.0 atmospheres to increase the inherent rigidity of the cylinder. This improves the stability of the cylinder for various processes, such as for photoengraving of the surface of the cylinder to prepare it as a screen-printing stencil.

10 Claims, 2 Drawing Figures

DEVICE FOR HOLDING A THIN-WALLED METAL CYLINDER

BACKGROUND OF THE INVENTION

The invention relates to a device for the stable holding of a thin-walled hollow metal cylinder by supplying a pressure medium into its inner space. The hollow cylinder is supported at its ends on the perimeter of two centering flanges.

Thin-walled hollow metal cylinders are used for various purposes such as, for example, for the production of pattern master stencils for electroplating or for printing patterns in the printing technology. The expression "thin-walled hollow cylinder" as used herein means a hollow metal cylinder with a wall thickness in the range of about 0.07 to about 0.7 millimeters. Although such cylinders have a relatively high rigidity of their own, this is insufficient for certain working of the outside surface, such as for example a mechanical or photographic patterning. For such working it is known to increase the rigidity by locating inside the hollow metal cylinder a rubber hose which can be sufficiently inflated by a pressure medium that it presses against the inner wall of the hollow cylinder to stress it for giving it the increased rigidity. The thin-walled metal cylinder is centered at its two ends by two centering flanges which are arranged on a support. Between these centering flanges there is a rubber hose which is inflatable by a pressure medium. The ends of the hose are mounted in a pressure-tight seal on a flange, and the hose expands radially to press against the hollow cylinder. The expansion for this is sufficient that the diameter, or circumference, required for treating the outer surface of the hollow cylinder is obtained.

The rubber hose referred to above nevertheless has a number of disadvantages. In order for the hollow metal cylinder to take on a cross-section which is as nearly circular as possible, the expanding of the inflatable rubber hose must be as uniform as possible, something which can be achieved only with great difficulty, and hence is accordingly costly. Since, usually, the length of such hollow cylinders is between about 1.0 and 4.0 m (meters), and the corresponding rubber hoses are not significantly shorter, it is necessary to provide support rings in the inner space of the hollow cylinder to prevent sagging. These rubber hoses are a problem, particularly in the use of a damaged hollow cylinder, such as one having a tear at the edge; these are torn into two or more pieces, because the stressing force is maintained by the rubber hose. After the bursting of the metal cylinder, the rubber hose locally overexpands, which decreases its further usefulness. Aside from this, such a rubber hose of a particular length is useful for various diameters, but only for a particular length of the hollow cylinder, so that there must be available a number of hoses corresponding to the used cylinder length.

It is an object of the invention to provide a device of the type described above and so designed that the disadvantages of the known types are avoided and that it is possible by simple handling and with this same device to make an adaptation for the particular length of the hollow cylinder to be held.

SUMMARY OF THE INVENTION

In accordance with the present invention, the pressurized space is formed by the wall of the hollow cylinder itself and the centering flanges.

DESCRIPTION OF THE PREFERRED EMBODIMENTS

Figure 1:
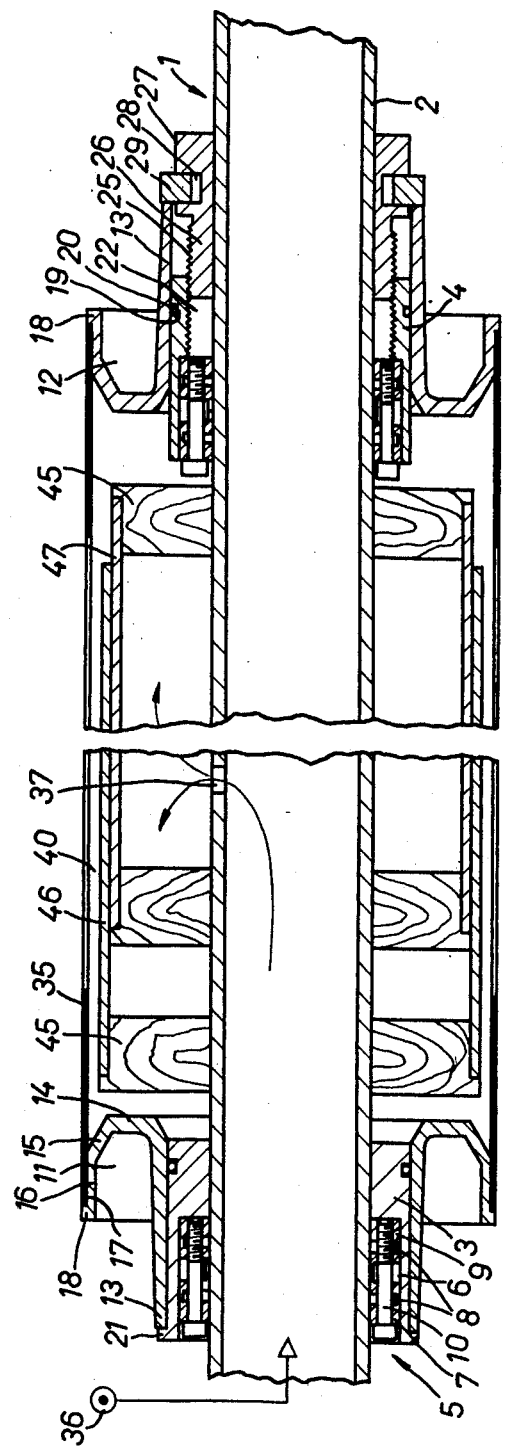
FIG. 1 is a longitudinal, axial section of a device for holding thin-walled, hollow, metal cylinders and stressing them in a radial direction in accordance with a preferred embodiment of the present invention.

The device illustrated in FIG. 1 has an arbor 1 which is rotatably mounted and is in the form of a round pipe 2. Two hubs 3, 4 are pushed onto the pipe 2 and tightened by means of a tightening device 5. The tightening device 5 lies in a recess 6 of the hubs 3, 4 and includes a resilient expansion ring element 7, comprising sections 8, 9 which forms an essentially cylindrical resilient body provided with radial grooves and a number of axial, partially-threaded bores into which bolts 10 are threaded. By a turning of the threaded bolts 10, the expansion ring element 7 can be varied in length to thereby exert pressure against the inner wall of the recess 6. This pressure then appears also against the outer wall of the pipe 2 and results in a pressure-tight and secure holding of the hubs 3, 4 on the pipe 2.

The outer perimeter of the hubs 3, 4 is designed as a seat for the centering flanges 11, 12. The centering flanges 11, 12 have a flange hub which is adjustably guided over the outer perimeter of the hubs 3, 4 with one end leading to a ring-shaped disc 14 connected by a conical portion 15 to a cylindrical perimeter portion 16. On the outer perimeter of the perimeter portion 16 is a cylindrical seat 17, which at the free end of the perimeter portion 16 stops at a ring-shaped shoulder 18.

On the outer perimeters of each of the hubs 3, 4 there is machined a groove 19 in which there is inserted a resilient sealing ring, e.g. an O-ring. The sealing ring 20 should guarantee a pressure-tight seal between the hub 3, 4 and the centering flange 11, 12. On the side of the recess 6, the hub 3 has a ring-shaped shoulder 21, against which the flange hub 13 of the centering flange 11 rests.

The form of the hub 4 is somewhat different from that of the hub 3. On the side opposite the recess 6, it has a bore 22 with inside threading in which there is threaded a sliding sleeve 26 having an outer thread 25 and which is slidably guided on the pipe 2. Adjoining the outer threading 25, the sliding sleeve 26 has a cylindrical head 27 with a groove 28 machined into its outer perimeter. In the groove 28 lie two thrust ring halves 29 against which the flange hub 13 of the centering flanges 12 rest axially. The thrust ring halves 29 can be pushed, e.g. manually, completely into the groove 28.

The centering flanges 11, 12 with the seats 17 on the perimeter portions 16 are directed toward each other. On the seats 17 there can be readily pushed a thin-walled hollow metal cylinder 35 having a length of, for example, in the range of from 1.0 to 4.0 meters, depending upon the application. The cylinder can be a closed-wall cylinder or a screen cylinder with suitably closed openings.

The pipe 2 is connected to a pressure medium source. The pressure medium, preferably air, streams from the pressure source 36 through the pipe 2 and through an opening 37 in the wall of the pipe 2 into a pressure space 40 formed by the hubs 3, 4, the centering flanges 11, 12 and the hollow cylinder 35. The hollow cylinder 35 is thereby pressurized with e.g. 0.05 to about 1.0 atmospheres; as a result, the seats 17, the centering flanges 11, 12, and the inner wall of the hollow cylinder 35 form an annular seal slit opening (too small to be shown in the drawing) which, however because of its relatively long axial length still assures sufficient sealing. The seal is further improved by the shoulders 18. The holding of the hollow cylinder 35 can thereby result without additional means, and the mounting and demounting of the hollow cylinder on the device is simplified.

For mounting of the hollow cylinder 35, the thrust ring halves 29 are pushed into the groove 28 of the sliding sleeve 26, so that the centering flange 12 can be pulled off the hub 4. Now the hollow cylinder 35 can be set over the centering flange 11 and then the centering flange 12 again pushed on the hub 4. Since the length of the hollow cylinder 35 is known, the hub 4 can be moved and fixed in the right position prior to the pushing on of the hollow cylinder 35. After the centering flange 12 is pushed on the hub 4, the sliding sleeve 26, with the thrust ring halves 29, is threaded into the bore 22 until the metal hollow cylinder 35 is supported on the seats 17 of the centering flange 11, 12. Now the pressure space 40 can be pressurized with the pressure medium from the pressure source 36. As soon as the desired outer diameter of the hollow cylinder 35 is obtained by appropriate adjustment of the pressure of the pressure medium, it is held constant by a suitable regulating device, e.g. by a known pressure regulator valve.

For removal of the hollow cylinder 35 after release of the pressure, the thrust ring halves 29 are again pressed into the groove 28 of the sliding sleeve 26. Then the centering flange 12 pulled from the hub 4, whereupon the hollow cylinder 35 may be removed. A special use of the described device arises in mounting screen printing stencils for photomechanical patterning. For this there is used, for instance, a metal screen cylinder which is coated on its outer side with photoresist. The photoresist also fills the screen openings, so that the cylinder now has a closed, hollow space. This is now put on the described device and stressed by pressurizing. The attachment of the photoresist to the screen cylinder is sufficient to withstand the stress on the inner side. On the outer surface of the so-prepared screen cylinder, there is put down a masking layer, which is then illuminated. Thereupon, the screen cylinder can be further treated in a known manner until it is a finished screen printing stencil.

In photoengraving of a screen printing stencil cylinder, it is possible that light from the light source used for illuminating the photosensitive layer penetrates through the openings of the screen printing stencil cylinder into the inside space and causes a defective illumination of the opposite side. In order to prevent this, there can be provided between the centering flanges 11, 12 as illustrated in FIG. 1, two light blocking cylinders 46, 47 having flanges 45 and which telescopingly slide together. By a sliding together or apart, these cylinders 46, 47 are adapted to the length of a particular screen printing stencil cylinder to be held.

The device according to FIG. 1 makes possible the holding of cylinders of various lengths, since the centering flange 12 with its hub 4 can be fixed on the pipe 2 according to the desired length. After the hollow cylinder 35 is put on the centering flanges 11, 12, the centering flange 12 can be adjusted with the aid of the sliding sleeve 26 until the shoulders 18 of the centering flanges 11, 12 rest almost with no clearance against the ends of the hollow cylinder 35.

In many cases, the flanges with the telescoping cylinders 46, 47 supported on a pipe 2 are not necessary. In this case the device can be simplified in accordance with FIG. 2 and can be set up, for example, on an available lathe. The pipe 2, which no longer need extend the entire length of the device and therefore can be kept short, is for example fastened in a rotatable headstock of a lathe in a known manner not shown. There could also be used some other support by which the pipe 2 is rotatably borne. The hub 3 is fastened to the end, e.g. by glueing or welding, so that it cannot be loosened. The centering flange 11 is supported on the outer perimeter of the hub 3 and sealed by means of the sealing ring 20. The perimeter portion 16 of the hub 3 has the cylindrical seat 17 with the shoulder 18, as in FIG. 1.

The centering flange 12 is located opposite the centering flange 11 and is sealed on the hub 4 by means of the sealing ring 20. The hub 4 forms here a part of a stub shaft 50 which is rotatably held in a support 53 by means of roller bearings 51 which are held by securing rings 52, e.g. spring rings. The support 53 has guide bores 55 provided with guide bushings 54, through which there extend guide rods 56. The support 53 can be pushed along the guide rods 56 until the centering flange 12 has the spacing necessary for the mounting of the hollow cylinder 35. In this position, the support 53 can be locked in place by a locking device 57, e.g. a locking pin.

Figure 2:
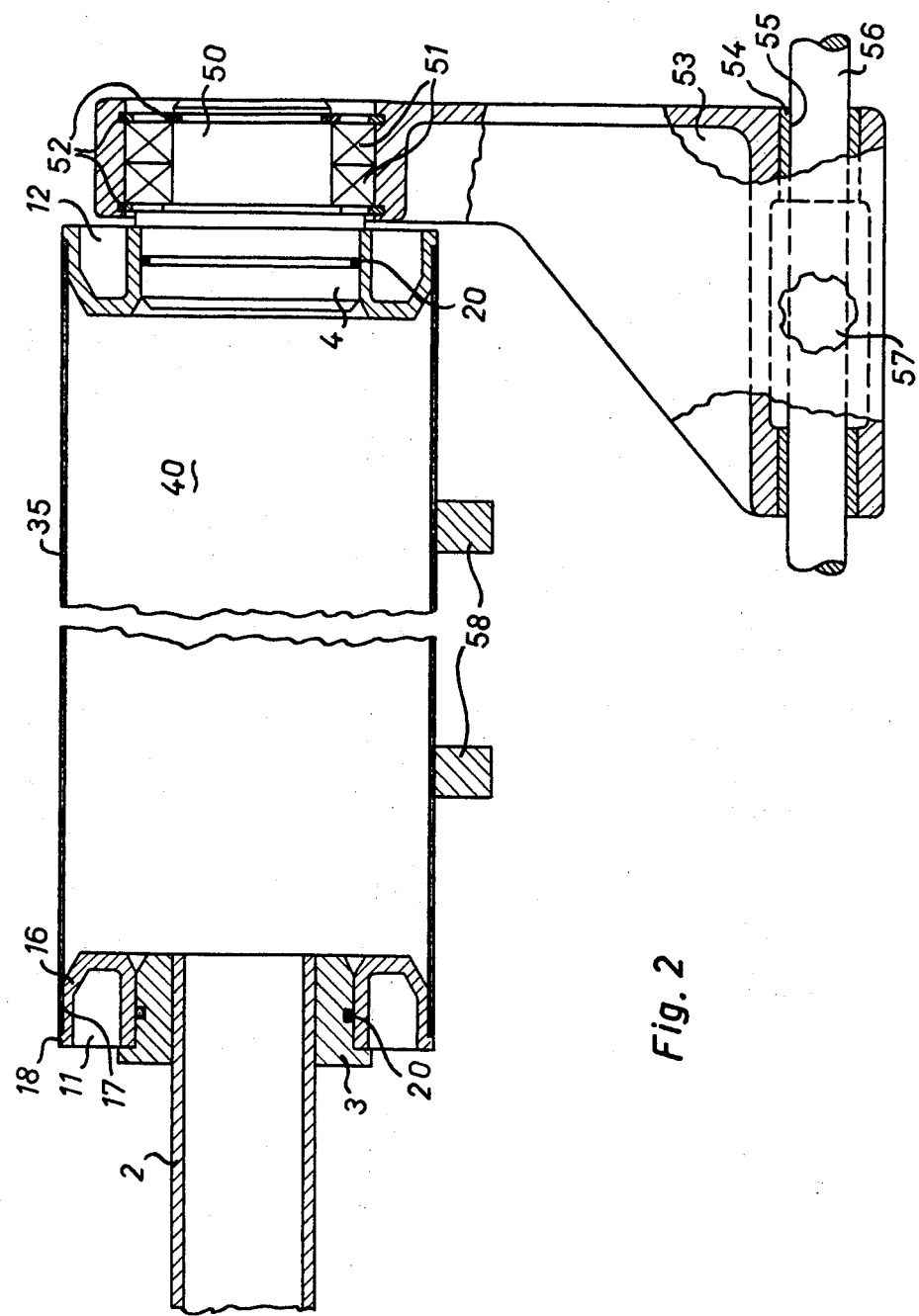
FIG. 2 is a longitudinal, axial section of a device for holding thin-walled, hollow, metal cylinders and stressing them in a radial direction in accordance with another embodiment of the present invention.

In FIG. 2 there are shown semicircular support bushings 58 adapted to the diameter of the hollow cylinder 35 which serve to simplify pushing onto the centering flanges the hollow cylinder 35 which is to be held.

The device of FIG. 2 is equally simple in its construction as that of FIG. 1. This simple construction of the device in accordance with FIGS. 1 and 2 is attained above-all in that the hollow cylinder 35 is itself used for forming the pressure space, particularly when the hollow cylinder 35 is a screen-printing stencil which is prepared to be illuminated. A further simplification of this device consists of an annular seal space which extends axially between the inner wall of the hollow cylinder 35 and the seat surfaces 17 of the centering flanges 11, 12. Through this, it becomes unnecessary to have a completely seated seal. Since the pressure medium has a pressure of only from about 0.5 to about 1.0 atmospheres and the axial length of the seal space is much longer than its thickness, the leakage through the seal space is not significant. Thus, the hollow cylinders can be readily inserted and removed from the device.

I claim:

1. An apparatus for releasably holding a thin-walled cylinder, comprising
 carrier means having fluid pressure supply means coupled thereto;
 first and second hubs mounted on said carrier means, said first hub being adjustably mounted on said carrier means to vary the spacing between said hubs;

first and second centering flanges slidably and sealingly coupled to said first and second hubs, respectively, each said flange having an outer perimeter seat surface; and a thin-walled cylinder having ends thereof mounted on said flanges, said cylinder and said flanges comprise means defining a pressure space in fluid communication with said fluid pressure supply means so that when pressure is supplied to said space by said fluid pressure supply means, axially extending, annular seal slit openings are formed between said cylinder and said outer perimeter seat surfaces of said flanges and in fluid communication with said pressure space.

2. An apparatus according to claim 1, wherein said first hub has a tightening device comprising an expansion ring element to fasten said first hub to said carrier means and to provide a pressure tight connection therebetween.

3. An apparatus according to claim 1, wherein one of said hubs has a sleeve slidably coupled thereto, said sleeve having a generally annular groove formed in an outer surface thereof and a thrust ring mounted in said groove for radial movement between expanded and retracted positions, in said expanded position said thrust ring abuts the flange on said one hub to prevent axial movement therebetween in a direction away from the other hub, and in said retracted position said thrust ring frees the flange on said one hub to permit axial movement in a direction away from the other hub.

4. An apparatus according to claim 3, wherein said sleeve and one of the hubs are threadably coupled.

5. An apparatus according to claim 3, wherein said thrust ring comprises two ring halves.

6. An apparatus according to claim 1, wherein said flanges have radially extending shoulders adjacent said outer perimeter seat surfaces which abut opposite ends of said cylinder.

7. An apparatus according to claim 1, wherein a light-blocking cylinder is slidably mounted on said carrier means within said pressure space, said light-blocking cylinder being adjustable in length.

8. An apparatus according to claim 1, wherein said cylinder is a screen covered by a photoengraving coating.

9. An apparatus according to claim 1, wherein said carrier means comprises an elongated arbor extending substantially the entire length of the apparatus, and said first and second hubs are adjustably mounted on said arbor to locate said hubs independently along the length of said arbor.

10. An apparatus according to claim 1, wherein said first hub is rotatably mounted in a support, and said support is slidable on said carrier means and has means for locking said support in position.

* * * * *